United States Patent [19]

Frager et al.

[11] Patent Number: 5,603,040

[45] Date of Patent: Feb. 11, 1997

[54] POWER MANAGEMENT CONTROL UNIT FOR A COMPUTER PERIPHERAL

[75] Inventors: David L. Frager; Joseph W. Bell, Jr., both of Austin, Tex.

[73] Assignee: Dell USA, L.P., Austin, Tex.

[21] Appl. No.: 581,750

[22] Filed: Jan. 2, 1996

Related U.S. Application Data

[63] Continuation of Ser. No. 164,595, Dec. 9, 1993, abandoned.

[51] Int. Cl.$^6$ ................................................. G06F 1/32
[52] U.S. Cl. ................................................. 395/750
[58] Field of Search ........................... 395/750; 364/707

[56] References Cited

U.S. PATENT DOCUMENTS

| | | | |
|---|---|---|---|
| 5,167,024 | 11/1992 | Smith et al. | 395/375 |
| 5,335,168 | 8/1994 | Walker | 364/707 |
| 5,359,540 | 10/1994 | Ortiz | 364/492 |
| 5,375,245 | 12/1994 | Solhjell | 395/750 |

*Primary Examiner*—Jack B. Harvey
*Assistant Examiner*—David A. Wileg
*Attorney, Agent, or Firm*—Henry N. Garrana; Mark P. Kahler; Diana L. Roberts

[57] ABSTRACT

A power management control unit and system is provided for selectively controlling ac power to one or more computer peripheral devices. The power management control unit includes a power cord connected to an ac supply and an outlet pin capable of electrically receiving the peripheral device. The management control unit also includes an ac switch electrically coupled between the power cord and the outlet pin, such that the switch can modulate conduction between the power cord and the outlet pin during use. The power management control unit is maintained separate from existing computers and peripherals such that computers and peripheral devices need not be retrofitted or adapted with the control unit. The control unit takes advantage of video control signals available at the computer video output in order to turn off or on ac power to the outlet pin.

11 Claims, 4 Drawing Sheets

POWER MANAGEMENT CONTROL UNIT FOR A COMPUTER PERIPHERAL

This is a continuation of application Ser. No. 08/164,595 filed Dec. 9, 1993 now abandoned.

BACKGROUND OF THE INVENTION

1. Field of the Invention

This invention relates to a computer peripheral device and, more particularly, to an apparatus and system for controlling power to the peripheral device.

2. Background of the Relevant Art

The concept of providing multiple modes of operation within a laptop personal computer (PC) is well known. Laptop personal computers often utilize a power management system which controls power to various devices within the laptop computer. To conserve battery power, the power management system continuously monitors various circuit functions of the computer such that devices which are not in use are disconnected from the power source or undergo reduced power consumption. As described in U.S. Pat. No. 5,167,024 to Smith, et al. (incorporated herein by reference), various devices are deactivated or placed in a stand-by state depending upon the mode of operation chosen and the amount of power necessary for the devices.

The United States Environmental Protection Agency (EPA) has recently launched an energy conservation program which would borrow many concepts earlier developed in the power management of laptop computers. In particular EPA wishes to encourage computer manufacturers to introduce energy-efficient desktop personal computers and thereby reduce air pollution associated with electricity generation. With personal computer use on the rise, it is imperative that computer energy consumption be monitored and controlled. In order to meet the guidelines set by the EPA, it would be advantageous to present desktop computers which consume very little power (e.g., less than 30 watts) when placed in a low power mode of operation.

A large majority of power consumed by a desktop computer is by the various peripheral devices connected to the computer. For example, a conventional cathode ray tube (CRT) requires energy not only to drive the electrons from the cathode, but it also requires energy to accelerate the electrons from the cathode as well as energy to deflect or scan the electrons across the phosphor screen. Other peripheral devices such as the computer printer, e.g., impact printer, dot matrix printer, ink jet printer, thermal printer and laser printer require energy to drive the impact units, deflect the ink jet spray nozzles, heat the thermal printer printhead, and modulate the laser beam across the print surface at high speeds. Other peripheral devices such as CD-ROMs, disk drives, tape units, modems, etc., also require a large portion of the total energy consumed by the personal computer. As defined herein, "peripheral device" refers to any device which can be controlled and monitored by a personal computer. A peripheral device includes a visual display, a memory device, or any device which can present an output or input from or to the personal computer as a result of instruction sets stored within the computer.

To reduce power consumption of a personal computer, it is therefore important that power consumption within the peripheral device be monitored and controlled depending upon its state of operation. During times in which the devices are not being used, the devices should be turned off. For example, if the CRT screen is not instructed to change after a set time has elapsed, it should be disconnected from the ac power supply, or "powered down". Likewise, a printer, tape drive unit, CD-ROM, modem, or disk drive which is not being used within a set period of time should also be powered down. In order to power down the periphery devices, it is important to avoid having to retrofit existing host computers or peripheral devices. Instead, it would be advantageous to utilize existing host output for controlling existing peripheral devices without having to add to or change the numerous host and peripheral units already in existence. Accordingly, the power management system must be presented as a unit separate from the host and/or peripheral device. Furthermore, the power management system must be able to discontinue ac power sent to the peripheral device based upon the presence of or absence of signals readily available at the output of the host. Furthermore, the control unit must operate within the guidelines set by the EPA and any proposals set forth by the Video Electronics Standards Association (VESA) for disconnecting power within a host peripheral unit when the unit is not or will not be in use.

SUMMARY OF THE INVENTION

The problems outlined above are in large part solved by the power management control unit and system of the present invention. That is, the power management unit hereof is manufactured separate from the host or peripheral device. The unit can receive a controlling signal from the host and, based upon that signal, control ac power sent to the peripheral device. The power control unit can drive at least one peripheral device, and can turn a single-device or multiple devices fully on or fully off. The power control unit operates off video signals normally sent from the host computer. Video signals include CRT raster scan control signals such as vertical and horizontal synchronization signals.

The synchronization signal is well recognized in raster scan display methodology as being the video controller output of the host computer, as being into the CRT display unit. A horizontal synchronization signal controls the horizontal deflectors within the CRT unit to move the electron beam from left to right. Horizontal synchronization pulses at the end of each scan inform the CRT to move the electron beam from the end of one line to the beginning of the next horizontal line. Vertical synchronization pulses tell the CRT unit that one complete picture, called a frame, is complete, and that it is time to begin the next frame. Desktop host units which utilize a CRT screen present the horizontal and vertical synchronization pulses as a normal consequence at the output of the video controller card coupled to the PC's motherboard. Video cards which produce formatted output such as standard video graphics array (VGS), enhanced graphics array (EGA), and super video graphics array (SVGA) are well known to the skilled artisan.

The horizontal and/or vertical synchronization signals sent from the host to the CRT can be intercepted and presented as an input to the power control unit of the present invention. If, for example, the data bus within the host PC unit experiences prolonged periods of inactivity, then the horizontal and/or vertical synchronization signals can be programmed inactive which, correspondingly, trigger the power control unit to deactivate one or more peripheral devices connected to the control unit. Thus, the power control unit can be programmed to monitor any form of computer activity (or inactivity) selected by the user. After a specified period of inactivity has elapsed, the host unit can terminate synchronization triggering—i.e., can reduce vertical and/or horizontal synchronization frequency to, for example, less than approximately 20 Hz. Exemplary modes of operation which can be monitored include keyboard, mouse, modem, printer, and memory (primary and secondary memory) activity.

Broadly speaking, power control unit of the present invention contemplates a unit which can be placed as a separate unit remote from and between an ac supply (i.e., 60 Hz house current) and the peripheral device. The power control unit includes a power cord capable of being plugged into the ac supply. The control unit further includes an outlet port or pin capable of electrically receiving the power cord of a peripheral device. The unit still further includes an ac switch electrically coupled between the power cord and the outlet pin. The switch can receive programmed input and control conduction between the power cord and the outlet pin during use. A suitable ac switch includes a triac. The triac has a first main terminal connected to the power cord, a second main terminal connected to the outlet pin and a gate terminal connected to a control signal. The control signal is an output signal derived from the computer. Preferably, the control signal is derived from a synchronization signal sent from the computer to the CRT monitor.

The present invention further contemplates a power control unit which can power up or power down (i.e., activate or deactivate) more than one peripheral device. The control unit may include at least three outlet pins, each of which is capable of being electrically coupled to a respective peripheral device. At least three ac switches are also included, each of which is electrically coupled between the power cord and a respective outlet pin. The three ac switches can control different conduction states between the power cord and the outlet pins during use. The conduction states comprise an on-state or an off-state for each pin. The on-state comprises maximum conduction (i.e., full house current and voltage) between the power cord and the outlet pins. The off-state comprises minimum conduction (i.e., substantially no house current and voltage) between the-power cord and the outlet pins. An active horizontal synchronization signal and an active vertical synchronization signal can, for example, turn on three peripheral devices. An inactive horizontal synchronization signal and an inactive vertical synchronization signal can, for example, turn off three peripheral devices. An inactive horizontal synchronization signal and an active vertical synchronization signal can, for example, turn on a select one of the three peripheral devices; whereas, an active -horizontal synchronization signal and an inactive vertical synchronization signal can, for example, turn on another select one of the three peripheral devices. Horizontal and vertical synchronization signals are generated by a user input from, for example, a computer keyboard or mouse, or the signals are generated by a computer input from, for example, a primary memory bus (i.e., DRAM, etc.) or secondary memory bus (i.e., disk units or CD-ROM).

BRIEF DESCRIPTION OF THE DRAWINGS

Other objects and advantages of the invention will become apparent upon reading the following detailed description and upon reference to accompanying drawings in which.

Figure 1:
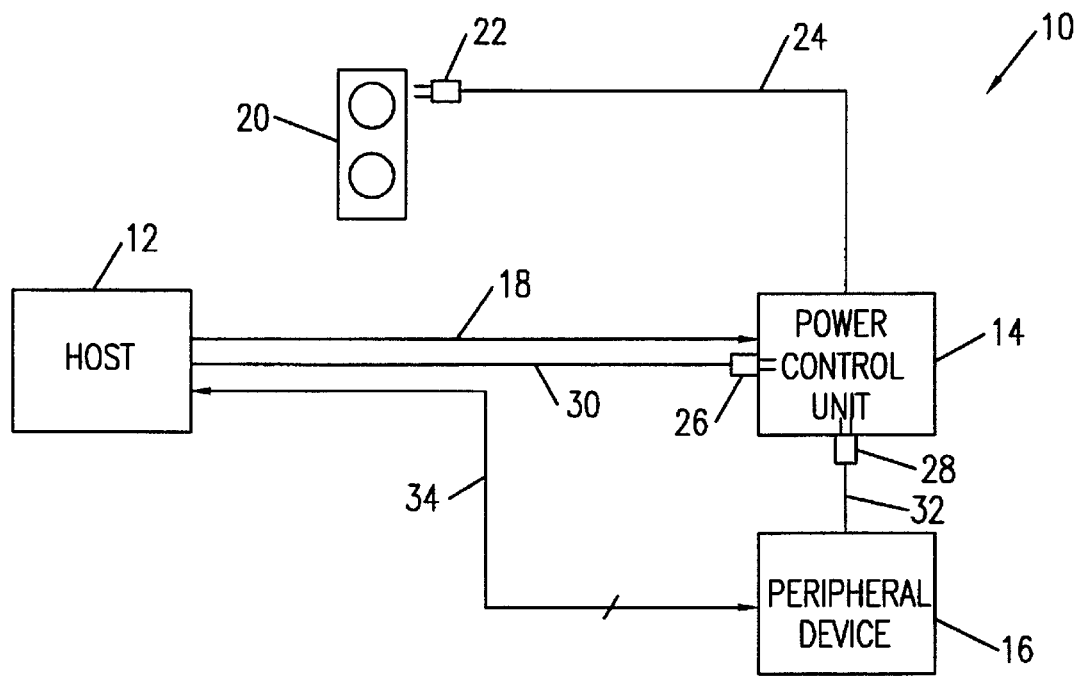
FIG. 1 is a block diagram of a power management control system according to the present invention.

While the invention is susceptible to various modifications and alternative forms, specific embodiments thereof are shown by way of example in the drawings and will herein be described in detail. It should be understood, however, that the drawings and description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Referring now to FIG. 1, a block diagram of a power management control system 10 is shown. System 10 includes a computer (or host) 12, a power management control unit 14, and a peripheral device 16. Host 12 includes any computer which can receive a video controller card necessary for emitting a video control signal 18. Details regarding the video controller card and associated control signal are presented hereinbelow.

Power control unit 14 is adapted to receive signal 18 and, upon receiving the signal, allow transmission of ac power from wall unit 20 to peripheral device 16. Wall unit 20 provides ac power when the standard ac plug 22 is coupled thereto. AC plug 22 is connected to a distal end of a power cord 24 coupled to control unit 14. Power control unit 14 thereby allows power access to host 12 and peripheral device 16 via ac plugs 26 and 28 capable of connection to receptacles upon unit 14. The circuitry associated with control unit 14 is remotely housed from host 12 and peripheral device 16. Control unit 14 interfaces to host 12 and peripheral device 16 without having to alter or retrofit the existing host or peripheral device. Circuitry associated with control unit 14 may be added to or retrofitted within a standard surge protector unit in order to function as both protection against transient ac noise as well as provide switching power to a connected peripheral device 16.

Host 12 and peripheral device 16 include power cords 30 and 32 which connect to respective ac plugs 26 and 28, as shown. Host 12 and peripheral device 16 communicate between each other over a standard bus line 34. If peripheral device 16 comprises a CRT, then a suitable bus line 34 can be an extended graphics array (EGA), video graphics array (VGA), or super video graphics array (SVGA) architecture, well defined by the industry standards set forth by the Electronics Industries Association (EIA) and the Video Electronics Standards Association (VESA). Peripheral device 16 may include other well known peripheral devices described hereinabove. Bus line 34 represents any bus line, parallel or serial which allows host 12 to communicate to and from the chosen peripheral device 16.

Figure 2:
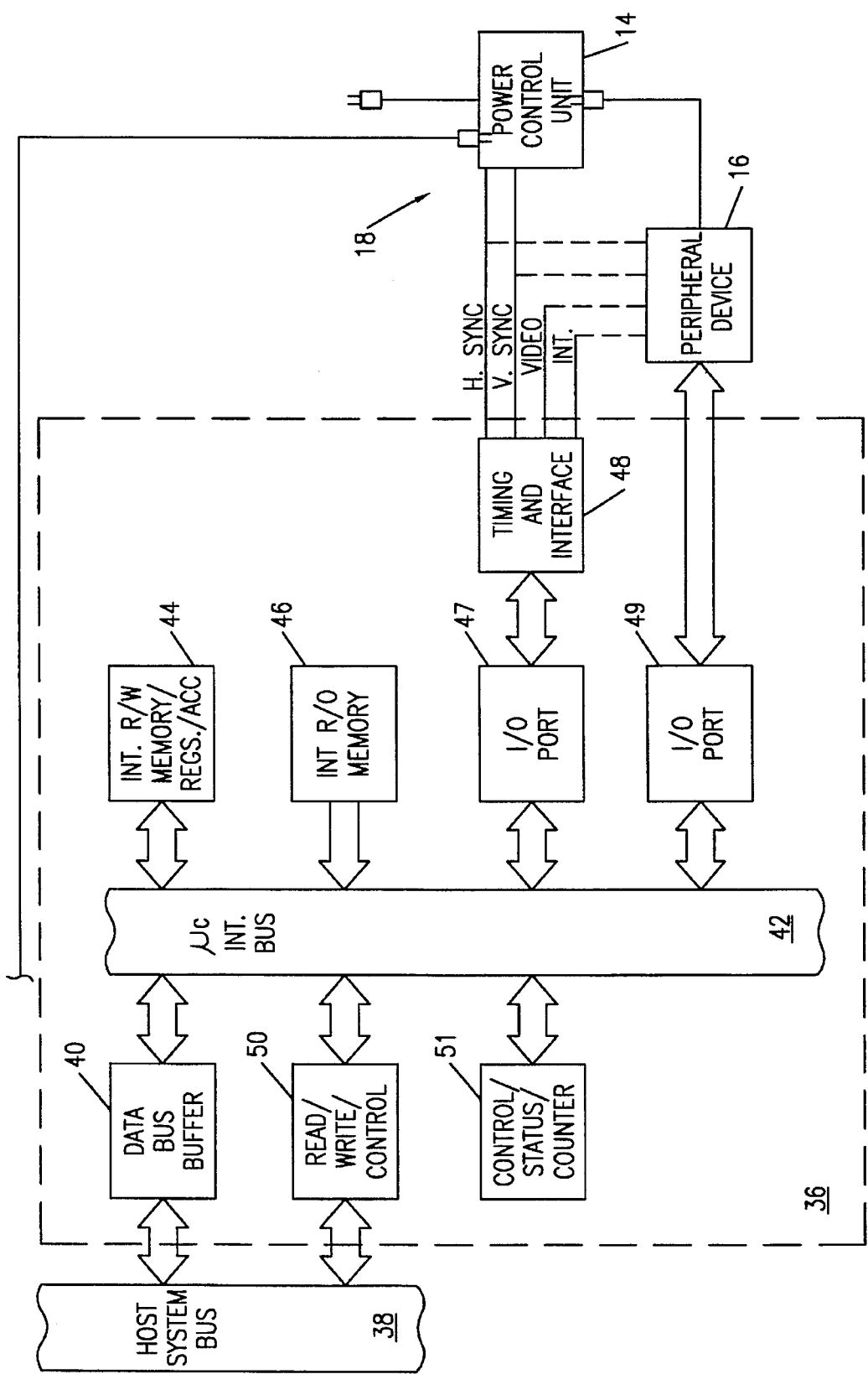
FIG. 2 is a more detailed block diagram of the power management control system with associated interface signals according to the present invention.

Referring now to FIG. 2, control system 10 is shown in greater detail and, more particularly, a video control card 36 which presents necessary control signal 18 is illustrated. Video controller card 36 interfaces with the data bus and read/write control bus of the host system internal bus 38. Buffer 40 receives or transmits data information to and from a microcontroller internal bus 42, and forwards the information to an internal read/write memory 44 (with registers and accumulators) based upon instructions stored within an internal read only memory 46. In order for a character or object to be displayed upon a CRT screen, control card 36 must present the video information to I/O port 47, which is then forwarded by timing and interface block 48 to a CRT screen.

Well known in CRT control methodology is the technique of "raster scan". Raster scan represents a methodology for producing characters upon a CRT screen. Control card 36 is used to generate a series of lines (rasters) across the face of the CRT. The electron beam associated with the CRT starts in the upper left hand corner of the screen and moves left to right across the screen, and top to bottom. The result is a series of lines across the screen. The vertical and horizontal movement of the beam is controlled by data sent through input/output port 47 and synchronized by timing and interface circuit 48 in order that the vertical and horizontal movement of the beams operate independent of one another according to horizontal synchronization signal (H.SYNC.) and vertical synchronization signal (V.SYNC.). When the electron beam reaches the end of the line or raster, it is brought back quickly to the beginning of the next line upon receipt of the horizontal synchronization signal (H.SYNC.) pulses. Line to line scanning is called retrace. During retrace, the electron beam is shut off by the grid electrode within the CRT so,that the user does not see the retrace lines. At the bottom right hand corner, a frame has been completed, and the beam goes back to the upper left corner of the screen upon receiving a vertical synchronization signal (V.SYNC.) pulses.

The technique for presenting horizontal and vertical synchronization signals (video control signals 18) to a CRT is well known. Generally speaking, the signals can be produced by programmable CRT controller units. A suitable CRT controller can be obtained from Intel Corporation, Santa Clara, Calif., part no. 8275 and its derivatives. CRT controllers can function on a single monolithic device to interface CRT raster scan displays with, for example, an Intel®-compatible microcomputer internal bus, such as that shown by reference numeral 43. Video control card 36 can therefore include a CRT controller (microcontroller) placed on a card and connected to a motherboard within host 12. CRT controllers are somewhat flexibly designed to allow simple interface to almost any raster scan CRT display with a minimum of external hardware and software overhead. CRT controllers include all of the blocks designated within video control card 36. CRT controller interfaces to system bus 38 using the read/write control 50 from bus 38. Moreover, the controller includes control/status counters 51 and, possibly, an additional input/output port 49. Input/output port 49 can be used to couple to another peripheral device— either a printer, disk drive, CD ROM, tape unit, or even another CRT.

Video control signal 18 represents the vertical synchronization signal, the horizontal synchronization signal, or both. In particular, control signal 18 is sent to the input board of a CRT unit and, as set forth by the present design, can be intercepted and sent to power control unit 14 in addition to or in lieu of it being sent to the CRT. Generally speaking, every CRT input board receives various signals including those shown by reference numeral 18. The CRT screen receives H.SYNC. and V.SYNC. for the reasons described above. Furthermore, CRT receives a VIDEO signal which is amplified and placed upon a grid electrode necessary for driving electrons from the CRT cathode to the phosphor screen in a defined raster pattern. Another signal, INT., maintains the intensity level of the CRT, as defined by controller card 36. H.SYNC., V.SYNC., or both, are intercepted and sent to power control unit 14 which, based upon the presence or absence of H.SYNC. or V.SYNC. pulses, regulates power to peripheral device 16. Peripheral device 16 can include the CRT which receives signals 18 (shown in dashed line) and, based upon those signals, the CRT can enter active or inactive modes of operation set by control unit 14.

Figure 3:
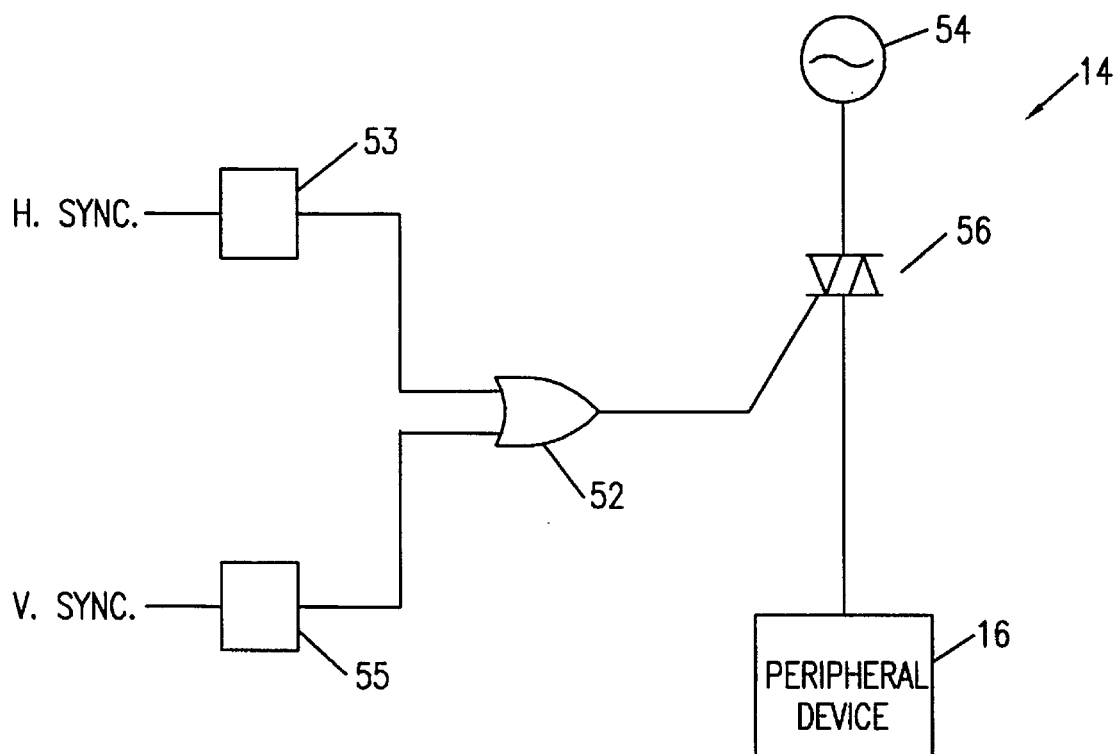
FIG. 3 is a circuit schematic of a power control unit according to an exemplary embodiment of the present invention.

Referring now to FIG. 3, an exemplary embodiment of control unit 14 is shown. In particular, control unit 14 can turn on or off peripheral device 16 based upon the presence or absence of pulses upon H.SYNC. or V.SYNC. signals. Respective H.SYNC. and V.SYNC. signals are filtered through monostable multivibrators 53 and 55 (often referred to as "one shots") and presented as inputs to OR gate 52. Multivibrators 53 and 55 each have a stable low output state and a quasi-stable high output state. During operation, the multivibrators remain in their stable state until a triggering H.SYNC. or V.SYNC. signal is received. Upon receipt of the SYNC. signals, the multivibrators change to the quasi-stable state for a fixed period of time. In the example shown in FIG. 3, the fixed period of time is chosen to be larger than the V.SYNC. or H.SYNC. pulse periods in order for the multivibrators to remain in the quasi-stable state for as long as the SYNC. pulses remain active (i.e., for as long as the-V.SYNC. and H.SYNC. pulses fluctuate at an active frequency exceeding, for example, 20 Hz.)

Quasi-stable high states are presented to OR gate 52, causing the output of OR gate 52 to toggle high. If either input of OR gate 52 goes low, then OR gate output will also go low. Upon receiving an input signal upon the gate terminal, corresponding to the presence of pulses upon both the H.SYNC. and V.SYNC. signals, triac 56 turns on for ac current in either direction. Thus, pulses upon both H.SYNC. and V.SYNC. signals indicates user-defined or computer-defined operation, thereby signaling the CRT to be active. An active CRT translates to full conduction between ac supply 54 and peripheral device 16. If, however, either H.SYNC. or V.SYNC. signal is inactive, then OR gate 52 output will go low and triac 56 will be off. Accordingly, power control unit 14, shown in FIG. 3, can turn peripheral device 16 on or off depending upon the presence or absence, respectively, of pulses upon H.SYNC. and V.SYNC.

Figure 4:
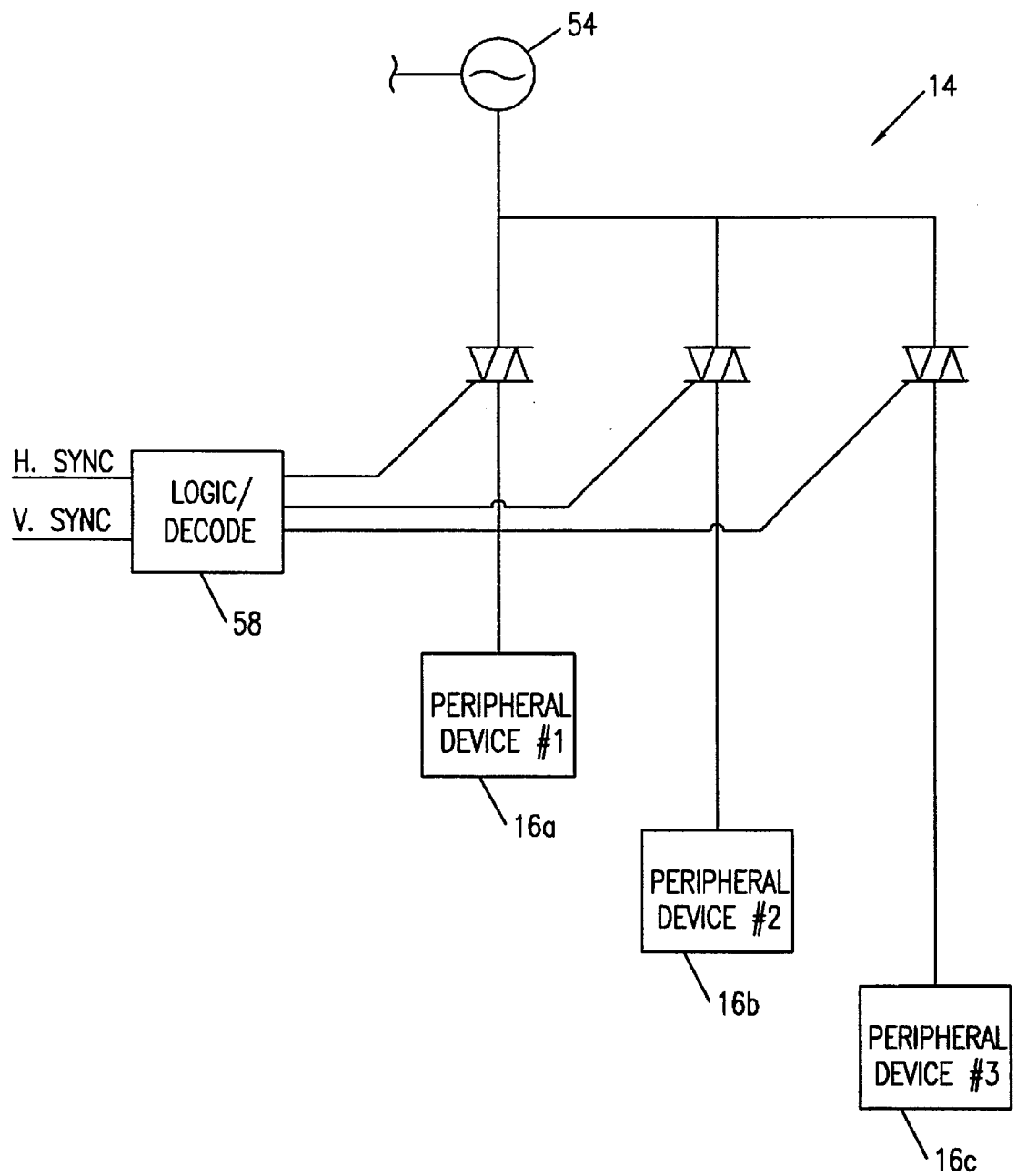
FIG. 4 is a circuit schematic of a power control unit according to another exemplary embodiment of the present invention.

It is recognized that many dissimilar types of peripheral devices 16 can be associated with host 12. In many instances three peripheral devices 16a, 16b and 16c, shown in FIG. 4, can be connected and controlled by host 12. H.SYNC. and V.SYNC. signals can be selectively used to control connection between ac supply 54 and a respective combination of peripheral devices 16a, 16b and/or 16b. For example, active H.SYNC. and V.SYNC. signals can couple ac power to all three outlet pins associated with control unit 14. Accordingly, each peripheral device 16a, 16b and 16c is activated. If, however, both H.SYNC. and V.SYNC. signals are inactive, then all three outlet pins can be disconnected and each peripheral device connected thereto is off. By activating either H.SYNC. or V.SYNC., a select one of the three peripheral devices can be turned on while the other two devices remain off. Logical connection of a select peripheral device or all peripheral devices to power supply 54 is achieved via a logic/decode circuit 58. Logic/decode circuit 58 receives both H.SYNC. and V.SYNC. signals filtered through a monostable multivibrator and produces a logical output based upon a specific binary representation at its input. Compilation of a suitable logic/decode output is a combination of logic and decode circuitry specified by the user for any application desired.

In order to enter an inactive state at the output of respective monostable multivibrators, H.SYNC. and V.SYNC. pulses must occur at a frequency less than a threshold frequency set forth above, and the inactive pulse frequency must be present for a period of time exceeding a specified (or programmable) amount. Timers associated with host 12 or control card 36 define a specific programmed time period necessary to allow invalid transient conditions to diminish. Inactive H.SYNC. and/or inactive V.SYNC. signals must be maintained during the entire transient time period chosen. If they are not inactive for the entire time period chosen, then the monostable multivibrator outputs will not transition to their stable states.

Figure 5:
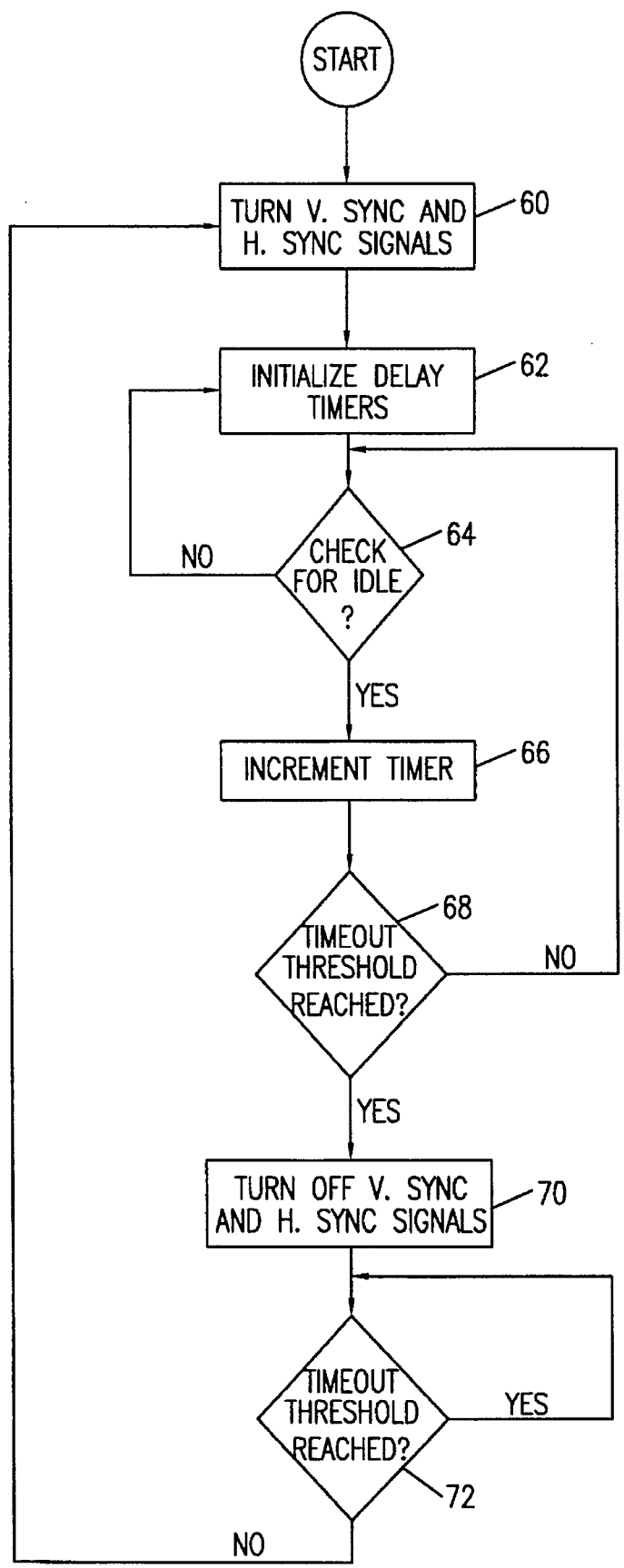
FIG. 5 is a flow diagram of a terminate and stay ready (TSR) program which can be used to operate the power control system according to the present invention.

Referring now to FIG. 5, a flow diagram of a program capable of being placed within host 12 or read-only memory 46 is shown. The software associated with operation of video controller (microcontroller) 36 can be easily compiled from well-known high level computer languages (e.g., BASIC or C) and can be readily assembled from the flow chart of FIG. 5. Block 60 indicates that when system 10 begins operation, the V.SYNC. and H.SYNC. signals are turned on. Initiation of V.SYNC. and H.SYNC. signals occurs through user interaction or by internal computer activity. Activated V.SYNC. and H.SYNC. signal pulses thereby prompts host 12 to initiate a delay timer 62 in order to keep track of the amount of time expended after the beginning of each idle moment. The program periodically monitors or checks for idle moments 64. If the host is idle, then the delay timer is incremented as shown by block 66. Conversely, if the host is not idle, then the delay timer is reset or re-initialized. Thus, the delay timer keeps track of the amount of time elapsed between moments of computer activity.

Once the delay timer surpasses a set threshold amount, as shown by decision block 68, then the V.SYNC. and H.SYNCo signals are turned off or rendered inactive 70. If the delay timer does not surpass the threshold amount, then system 10 continues to monitor for input activity and the timer continues incrementing. Once V.SYNC. And H.SYNC. signals are turned off, then they do not turn on again unless input activity occurs, as shown by decision block 72. The threshold amount can be a specified amount which can be determined by the user. The flow diagram of FIG. 5 is separately utilized for each of several peripheral devices.

It will be appreciated to those skilled in the art having the benefit of this disclosure that this invention is believed to be capable of selectively activating and deactivating one or more peripheral devices. Moreover, coupling circuits, logic circuits and switches used by control unit 14 can be varied in their connection and application, as would be obvious to one skilled in the art. Well-known circuits and signal lines contained within video control card 36 have not been described in detail in order not to unnecessarily obscure the present invention. It is to be understood that the form of the invention shown and described is to be taken as exemplary presently preferred embodiments. Various modifications and changes may be made without departing from the spirit and scope of the invention as set forth in the claims. It is intended that the following claims be interpreted to embrace all such modifications and changes.

What is claimed is:

1. A power management control system for selecting ac power to a plurality of peripheral devices, comprising:
   a single ac power supply;
   a plurality of peripheral devices;
   a power control unit comprising:
      a plurality of switches, each of which includes a control terminal and a pair of coupling terminals, wherein each said pair of coupling terminals is connected between the power supply and a respective one of said plurality of peripheral devices; and
      a logic decode circuit having two inputs and a plurality of outputs, wherein each of said plurality of outputs is connected to a respective said control terminal;
   a computer remotely coupled to said power control unit for forwarding a horizontal sync signal into one of said two inputs and a vertical sync signal into the other of said two inputs, wherein activation of a combination of said horizontal and vertical sync signals from said computer causes said power control unit to produce a corresponding combinative connection between said power supply and said peripheral devices.

2. The power management control system as recited in claim 1, wherein said horizontal and vertical sync signals are derived from said computer to an electronic display.

3. The power management control system as recited in claim 1, wherein said horizontal and vertical sync signals are derived from a cathode ray tube (CRT) port arranged upon said computer.

4. The power management control system as recited in claim 1, wherein said horizontal and vertical sync signals are analog signals.

5. The power management control system as recited in claim 1, wherein said logic decode circuit is configured to couple all of said peripheral devices to said power supply upon receipt of an active horizontal and vertical sync signals.

6. The power management control system as recited in claim 1, wherein said logic decode circuit is configured to couple one of said peripheral devices to said power supply upon receipt of an active horizontal sync signal and inactive vertical sync signal.

7. The power management control system as recited in claim 1, wherein said logic decode circuit is configured to couple one of said peripheral devices to said power supply upon receipt of an inactive horizontal sync signal and active vertical sync signal.

8. The power management control system as recited in claim 1, wherein said logic decode circuit is configured to decouple all of said peripheral devices from said power supply upon receipt of an inactive horizontal sync signal and inactive vertical sync signal.

9. The power management control system as recited in claim 1, further comprises monostable multivibrators coupled at said logic decode circuit inputs to determine if said horizontal and vertical sync signals output from said computer exceed a threshold frequency.

10. The power management control system as recited in claim 9, wherein said horizontal sync signal is active if its frequency exceeds the threshold frequency.

11. The power management control system as recited in claim 9, wherein said vertical sync signal is active if its frequency exceeds the threshold frequency.

* * * * *